United States Patent [19]
Anderson

[11] Patent Number: 4,638,764
[45] Date of Patent: Jan. 27, 1987

[54] SECURITY SYSTEM

[76] Inventor: Sharon K. Anderson, 5608 N. Roosevelt, Loveland, Colo. 80537

[21] Appl. No.: 735,755

[22] Filed: May 20, 1985

[51] Int. Cl.⁴ ............................................. A62B 35/00
[52] U.S. Cl. ....................................... 119/96; 119/109
[58] Field of Search ...................... 119/96, 109; 182/3; 128/165

[56] References Cited

U.S. PATENT DOCUMENTS

| | | | |
|---|---|---|---|
| 2,289,802 | 7/1942 | Norton | 119/109 |
| 2,458,489 | 1/1949 | Hallander | 119/109 |
| 2,888,063 | 5/1959 | Rose | 182/3 X |
| 2,937,023 | 5/1960 | Seymour et al. | 119/109 X |
| 3,911,497 | 10/1975 | Lewis, Jr. et al. | 128/165 X |
| 4,019,463 | 4/1977 | Kitchen | 119/109 |

Primary Examiner—Robert P. Swiatek
Attorney, Agent, or Firm—Dean P. Edmundson

[57] ABSTRACT

A security system is described for securing a small child to an adult. The system is useful when taking children to public places (e.g., shopping centers, amusement parks, etc.). Use of the system enables the parent to function in a normal manner without holding onto the child or carrying the child. Freedom of movement of the child, within a defined area, is also preserved. The security system comprises a strap having a loop on one end which can be placed around the wrist of the child. The loop is adapted to maintain a fixed diameter regardless of pulling force exerted by the child or parent. The other end of the strap is adapted to be attached to the parent.

7 Claims, 11 Drawing Figures

SECURITY SYSTEM

FIELD OF THE INVENTION

This invention relates to security systems. More particularly, this invention relates to security systems for preventing children from becoming separated from parents or other adults caring for the children. This invention also relates to security systems for mentally and physically impaired persons.

BACKGROUND OF THE INVENTION

When parents or babysitters or the like either are required, or simply desire, to take small children to public places it becomes very difficult to keep the children under constant restraint or supervision without carrying them. Yet, it is precisely when these children are in public places that the greatest danger exists, whether it be the danger of stepping into vehicular traffic or the danger of child snatching or simply a case where the children wander away and become lost.

If the child is old enough to walk unassisted there is always the danger that the child could become separated from the parent or other person caring for the child. Normally, if a child is old enough to walk unassisted, the child is too heavy to be constantly carried while in public places. Further, it would be more beneficial if the child would be permitted to walk.

Although it is possible for the parent or other person caring for the child to hold one hand of the child while in public, this is not always possible. Furthermore, it would become very tiring and very impractical to use one hand to hold the child at all times (for example, while shopping). Also, the child may not want to hold hands with the parent or other person and will therefore resist this measure. Yet, a child may dart into traffic or wander away and become lost in a very short period of time if not restrained in some manner.

Although a stroller may be used for very small children, they will want to be out of the stroller and be able to walk at least a portion of the time. Also, for children of slightly larger size, they may not want to be in a stroller at all.

It has also been proposed to use a harness which is fastened over and around the trunk of the child. The parent may then either hold onto the harness or to a strap secured to the harness. Such a product appears to have been negatively received by the public for the most part. Furthermore, such a harness must be fitted over the child's clothing and several adjustments may be required in order to properly fit so that it is sufficiently tight to prevent the child from getting out of it but not so tight as to restrict motion of the child or to be uncomfortable.

There has not heretofore been provided a simple and effective means for preventing children from becoming separated from their parents while still enabling a child to have freedom of movement within a defined area. The present invention provides a system which meets these criteria and more.

SUMMARY OF THE INVENTION

In accordance with the present invention there is provided a security system which is simple and effective for preventing small children from becoming separated from a parent or other person caring for the children in public places.

The security system of the invention comprises a length of flexible strap having first and second ends. The first end is adapted to form a loop which is capable of being detachably fastened or secured to an adult (e.g., the parent or other person caring for the child). The second end of the strap includes a loop which is adapted to be detachably secured around the wrist of the child. The second loop is adapted to maintain a fixed diameter around the child's wrist and will not pull tighter, and it will not loosen, in response to pulling force by the child or the parent.

The security system of the invention is very light in weight, compact and totally portable. It is easily folded or rolled-up when not being used and fits easily even into small pockets or a purse. The system is adaptable to children of any size or age. Further, the child is unable to loosen or remove the system. Use of this system also leaves the parent's hands free to attend to other necessary functions; also, the child is able to walk or move around with freedom within a defined area. Thus, the child is more comfortable and at ease than with prior systems. The system also provides a bond of security for the child, knowing that they cannot become lost from the parent. Of course, the parent also derives a strong sense of security from the system, knowing that the child cannot become separated or lost.

The security system of this invention may also be used in rest homes or institutions of all types where it is necessary or desirable to restrain persons because of mental or physical impairment.

BRIEF DESCRIPTION OF THE DRAWINGS

The invention is described in more detail hereinafter with reference to the accompanying drawings wherein like reference characters refer to the same parts throughout the several views and in which.

DETAILED DESCRIPTION OF THE INVENTION

Figure 1:
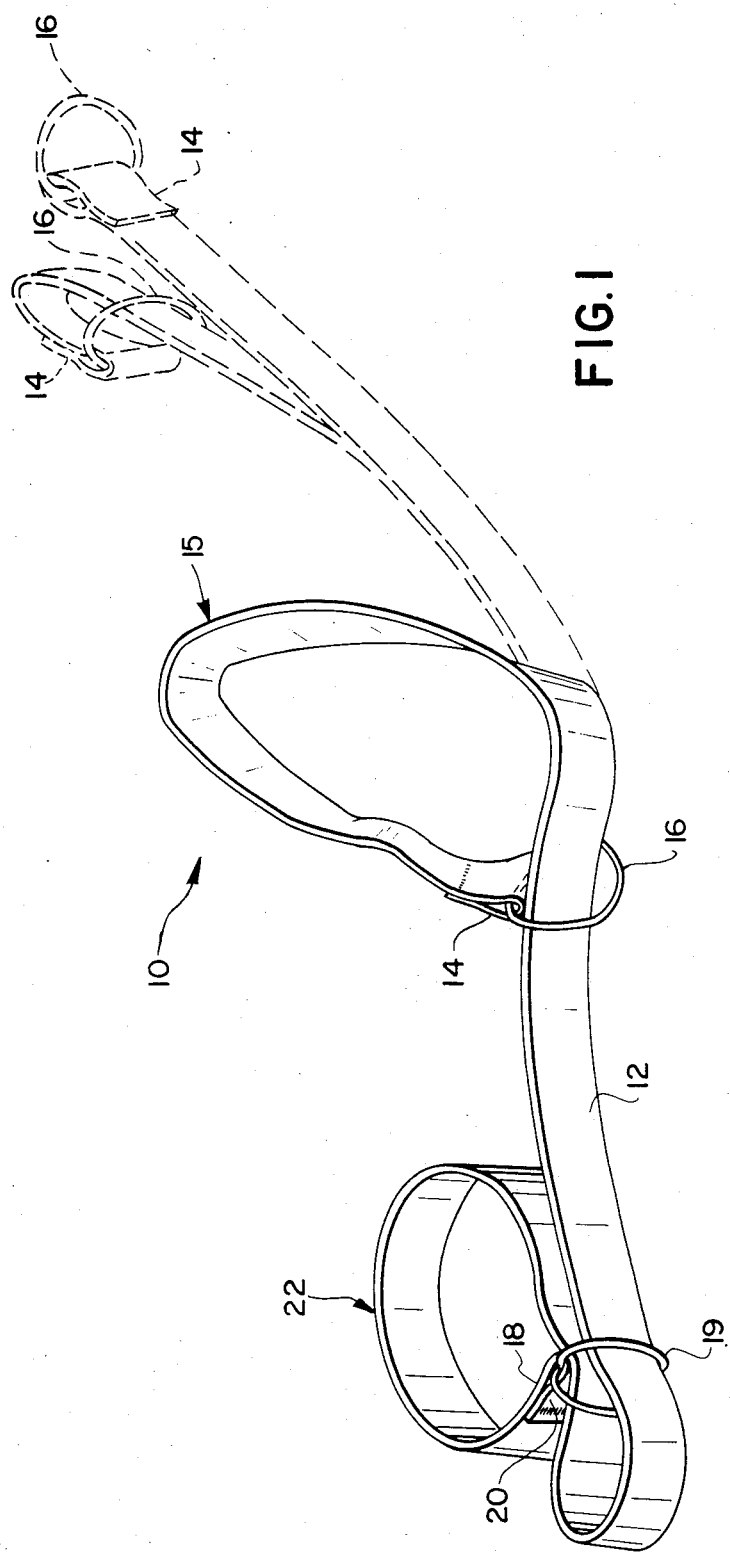
FIG. 1 is a perspective view of one embodiment of security system of the invention.

In FIG. 1 there is shown a perspective view of one embodiment of security system 10 of this invention comprising a length of flexible strap 12 having a first end 14 and a second end 20. As shown, first end 14 is adapted to form a loop 15 by pulling strap 12 through ring 16 which is secured to end 14 of strap 12.

Second end 20 preferably has two ring members 18 and 19 secured thereto. Strap 12 extends through both ring members 18 and 19, then over the top of ring member 18 and back through ring member 19 again, as illustrated. Thus, this end of strap 12 forms loop 22.

Figure 10:
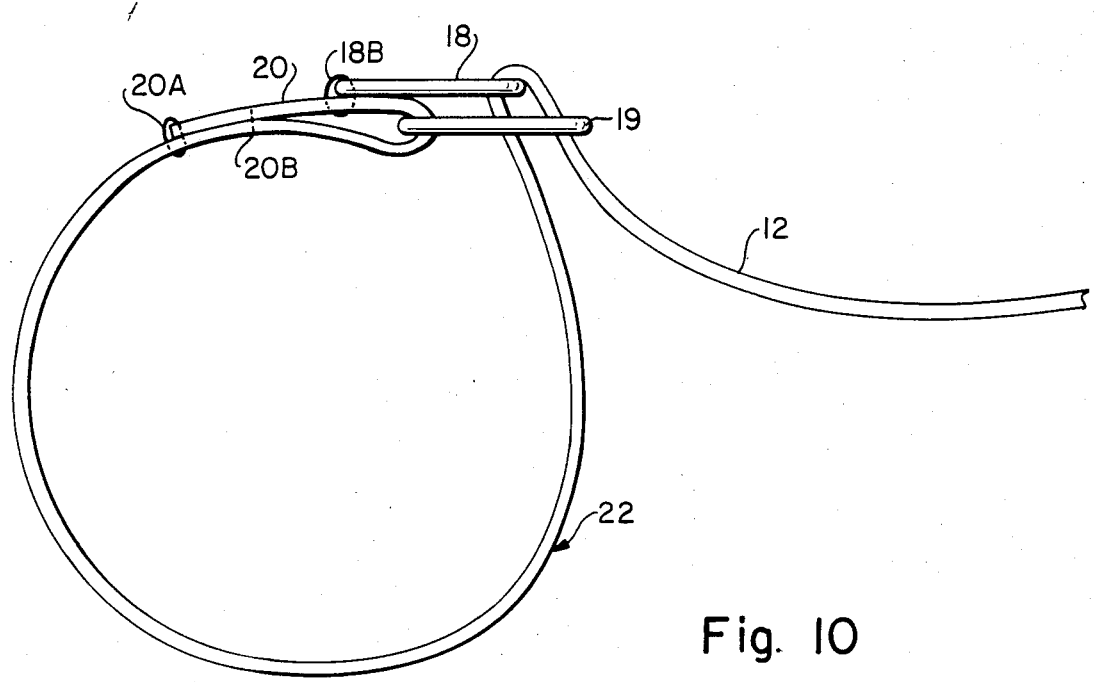
FIG. 10 is a side elevational view of one embodiment of a cuff member useful in the practice of this invention.
Figure 11:
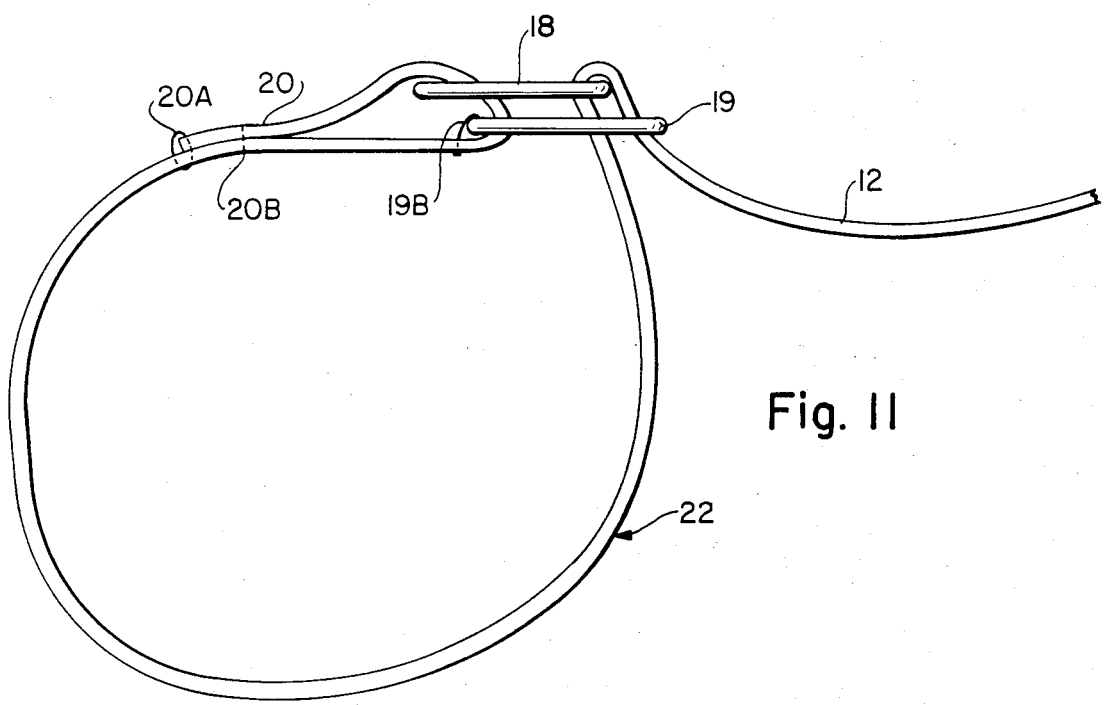
FIG. 11 is a side elevational view of another embodiment of a cuff member useful in the practice of this invention.

The manner in which strap 12 extends through rings 18 and 19 is also shown and illustrated in FIGS. 10 and 11. As shown there, strap 12 extends through rings 18 and 19, then it passes over the top of ring 18 and back through ring 19 again. When strap 12 is pulled tight, ring 18 is urged against ring 19 and the strap 12, because of its circuitous path through the rings, is unable to slip in either direction. Thus, loop 22 maintains a fixed diameter or size. This loop is intended to be placed around the wrist of the child.

In order to change the diameter of the loop it is necessary to first urge strap 12 back through ring 19 (this is illustrated in FIG. 1) and then, in a second step, to urge strap 12 back through ring 18. A child is unable to do this with one hand, even if the child understands the exact procedure required. As a result, the child is not able to loosen himself or herself from the system (either intentionally or inadvertently).

Figure 5:
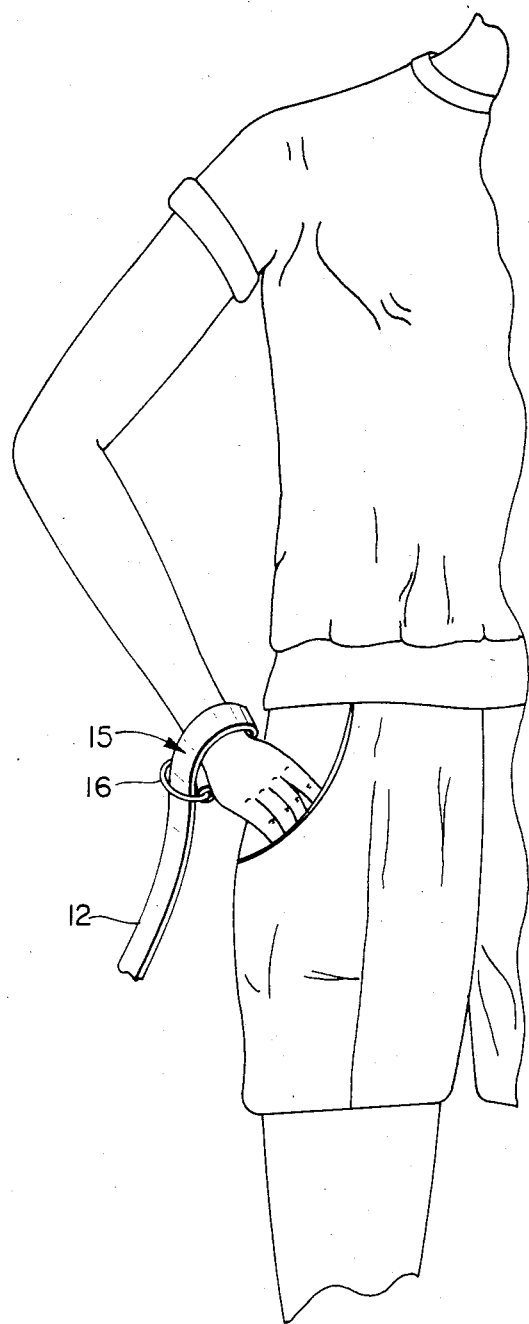
FIG. 5 illustrates one manner of attaching the embodiment of FIG. 1 to an adult.
Figure 6:
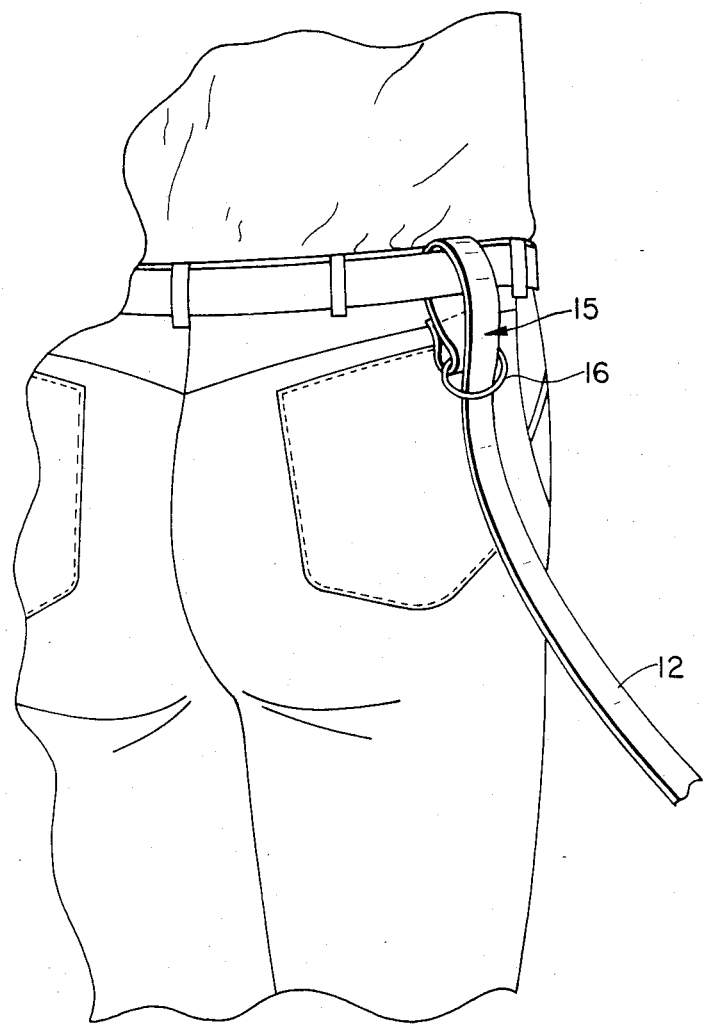
FIG. 6 illustrates another manner of attaching the embodiment of FIG. 1 to an adult.

The loop 15 is intended to be detachably fastened to the adult (i.e., a parent or other person caring for the child). For example, loop 15 may be placed around the wrist of the parent (as shown in FIG. 5) or it may be secured around the parent's belt (as shown in FIG. 6) or the parent's hand, etc.

Figure 2:
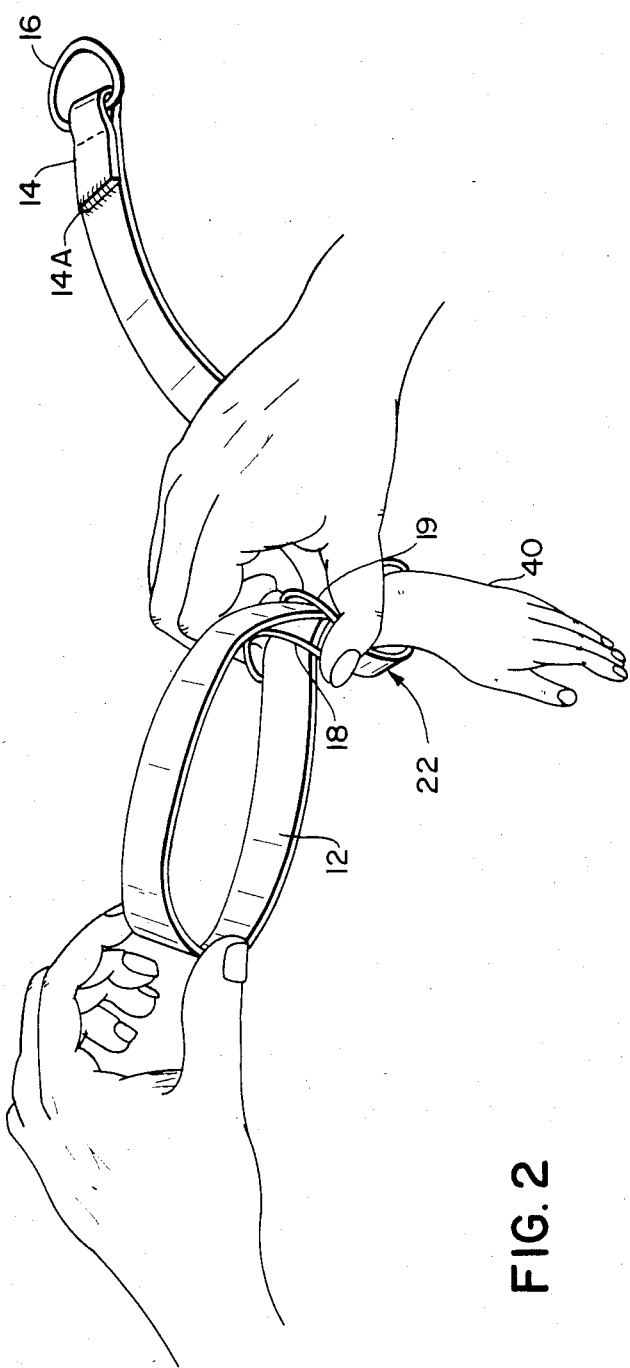
FIGS. 2 and 3 illustrate the manner in which the embodiment of FIG. 1 is secured around the wrist or arm of a child.
Figure 3:
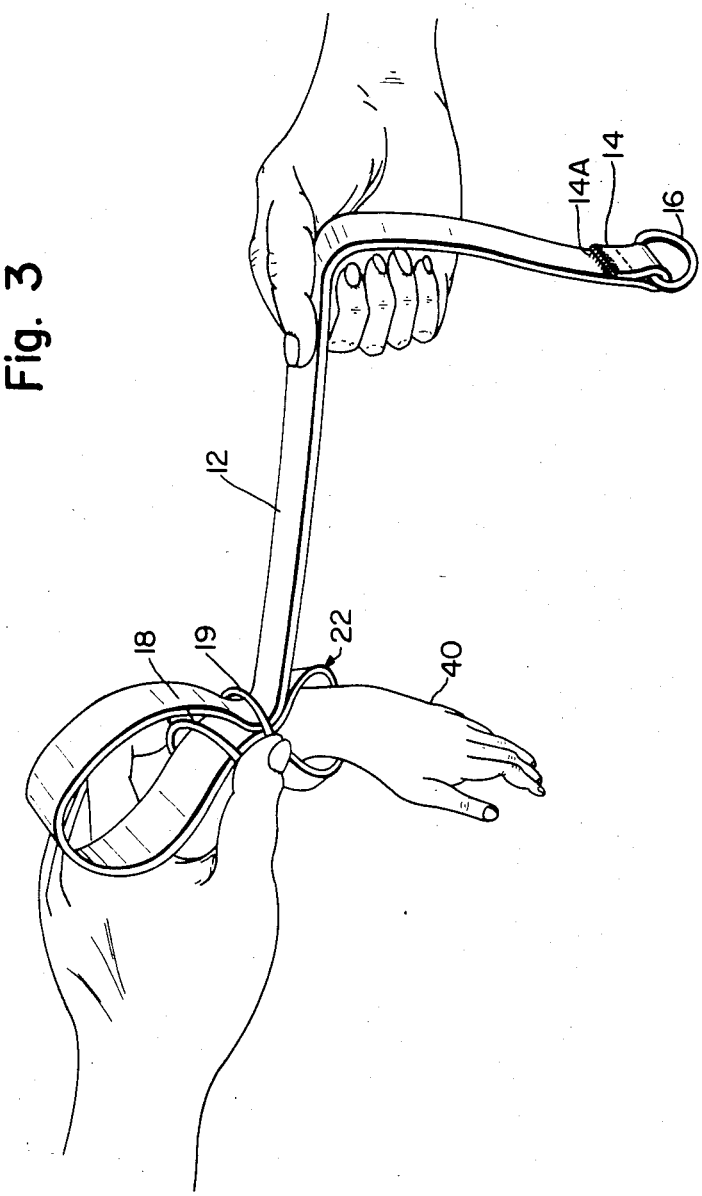
Figure 4:
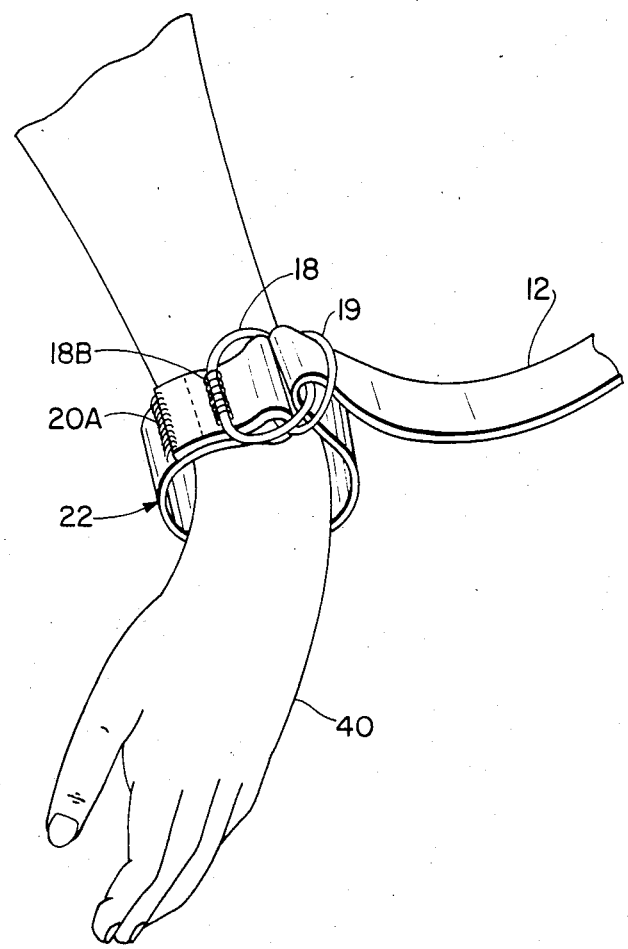
FIG. 4 shows the embodiment of FIG. 1 secured around the wrist or arm of a child.

To place the security system into use, the child's hand 40 is placed through loop 22 as shown in FIG. 2. Then strap 12 is pulled through ring 18 until the loop 22 is of the desired diameter (i.e., sufficiently small so that the child's hand will not slide back out of loop 22 and yet not so tight that the loop pinches the wrist or is uncomfortable). Then, as shown in FIG. 3, strap 12 may be pulled through ring 19 while holding ring 18. The secured loop 22 is illustrated around the child's wrist in FIG. 4.

Figure 7:
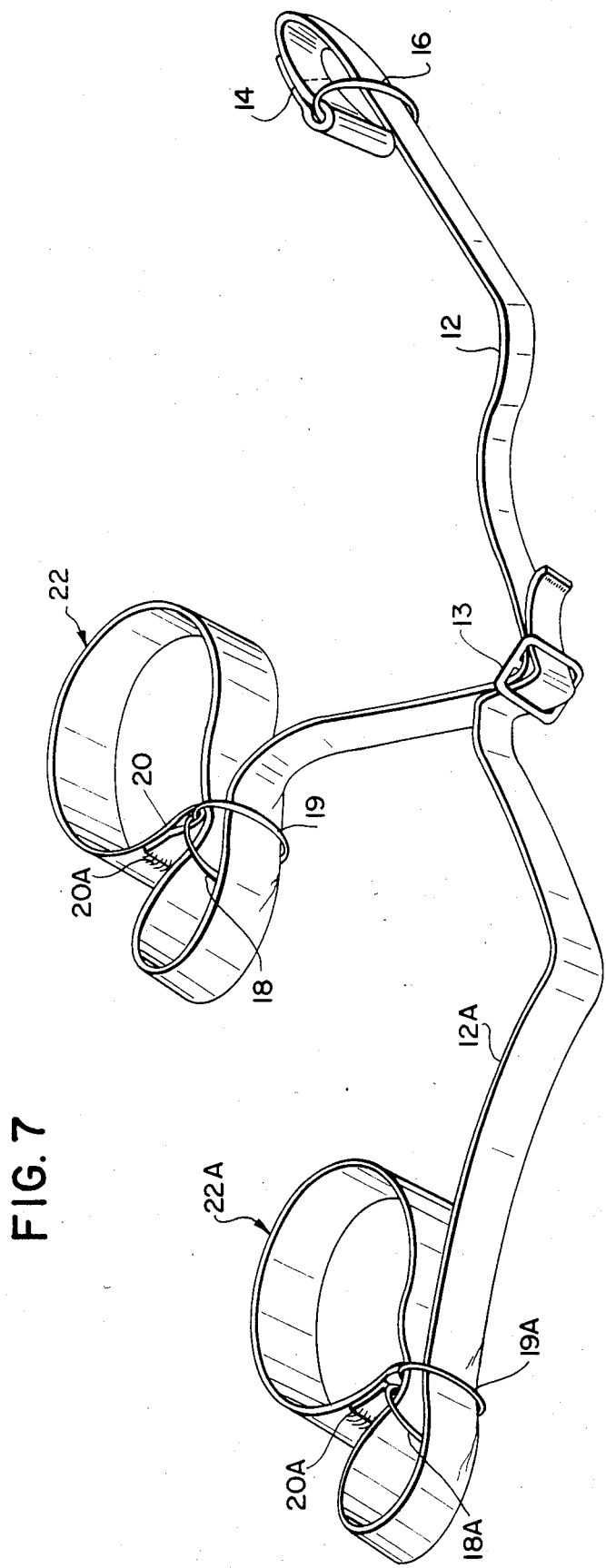
FIG. 7 is a perspective view of another embodiment of security system of the invention.
Figure 8:
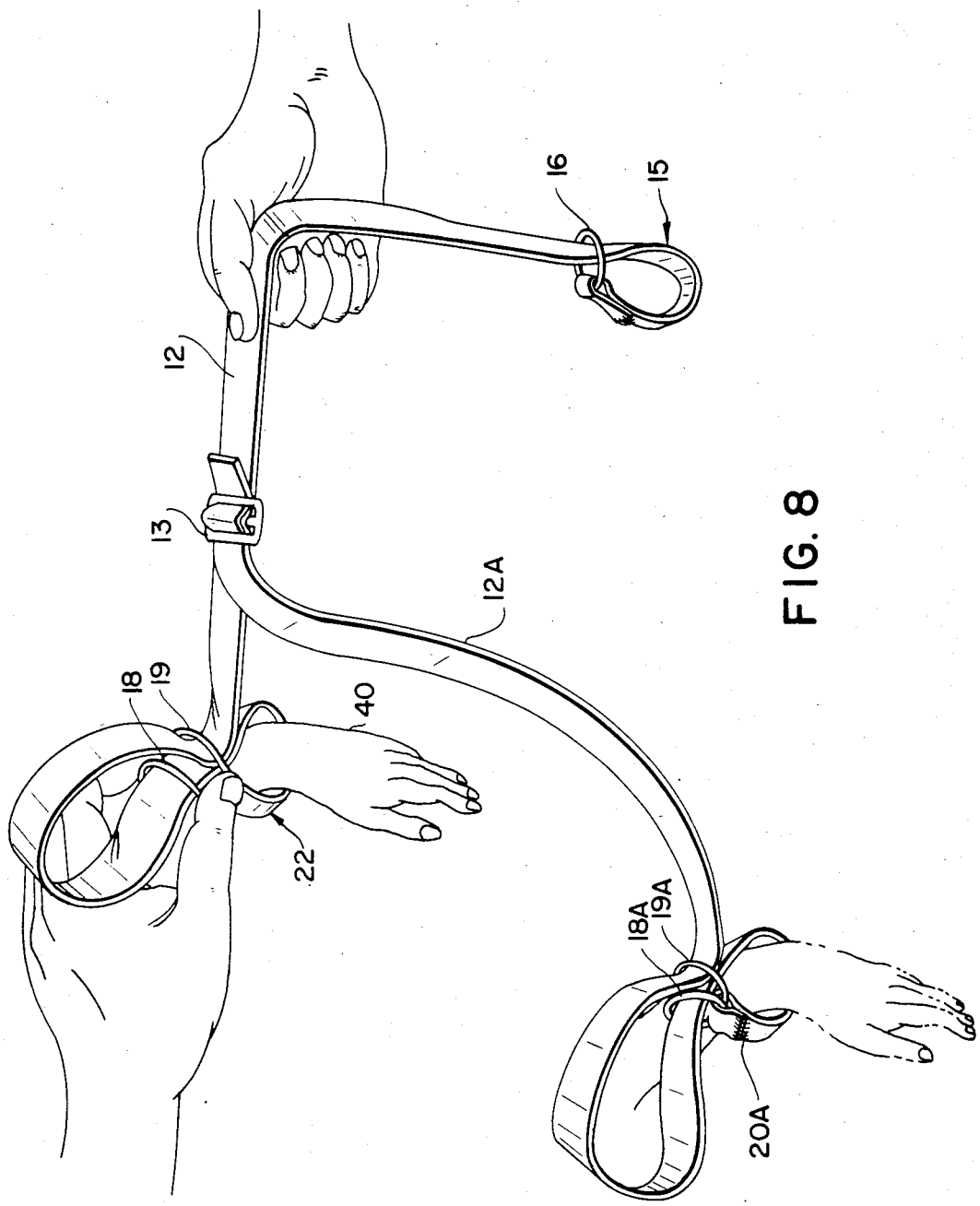
FIG. 8 illustrates the manner in which the embodiment of FIG. 7 is secured around the wrists or arms of two children.
Figure 9:
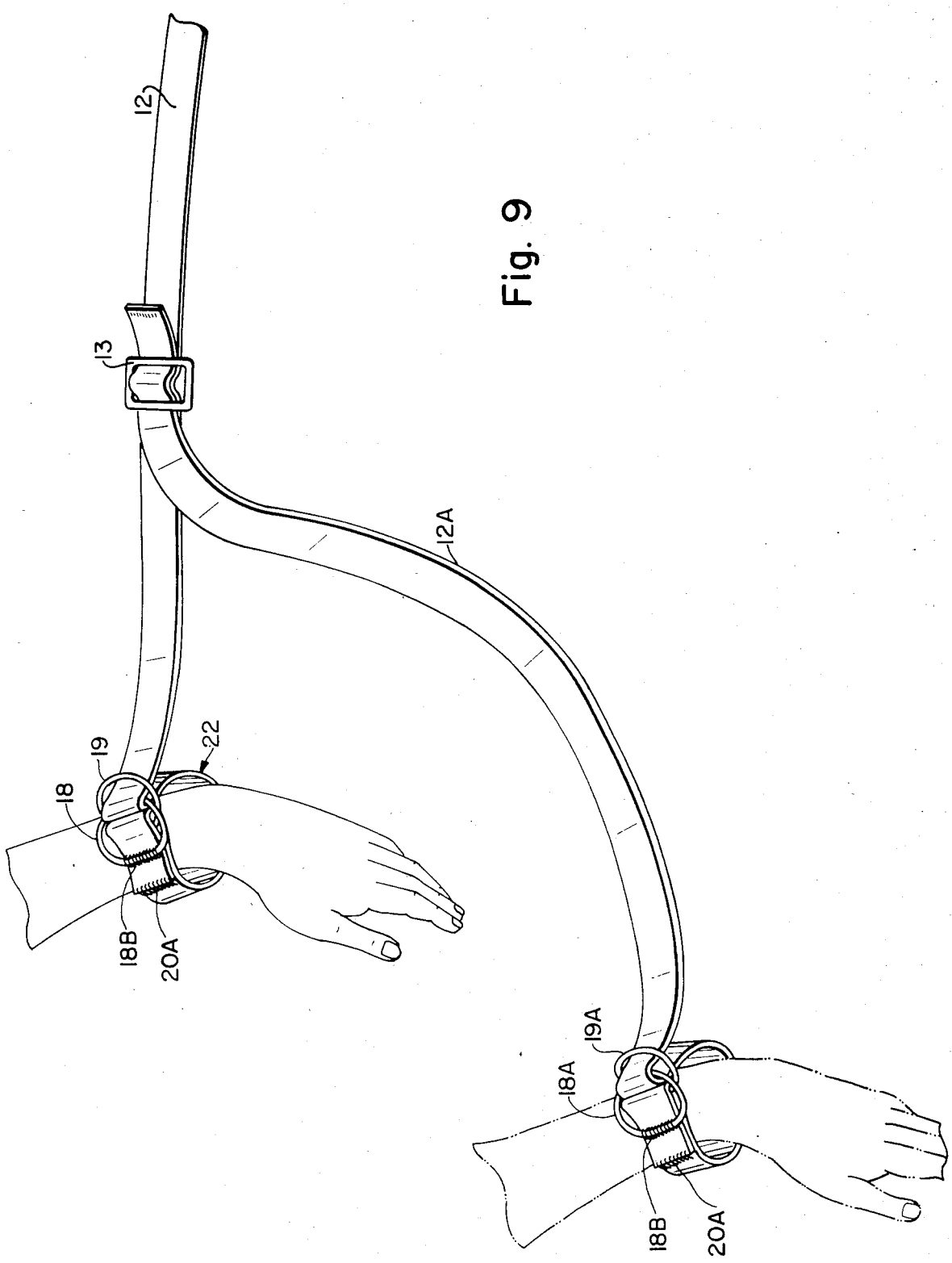
FIG. 9 shows the embodiment of FIG. 7 secured around the wrists or arms of two children.

Another embodiment of the security system of this invention is shown in FIGS. 7, 8 and 9. In this embodiment a second loop 22A is provided which is formed from strap 12A. Rings 18A and 19A are analogous to rings 18 and 19 and have the same functions. One end of strap 12A is removably secured to strap 12, e.g., by means of a buckle or connector 13. Strap 12A may be secured to strap 12 in various other manners, if desired. The advantage of using a releasable or removable attachment means is that strap 12A may be detached if it isn't needed for a second child.

The embodiment of FIGS. 7, 8 and 9 is useful when one parent is caring for two small children and it is desired to secure both of them to one main strap to be attached to the parent. Alternatively, the parent could use one embodiment of the type shown in FIG. 1 for each separate child. In another alternative, one child could be secured to the parent using the embodiment of FIG. 1, and a second child could be secured to the first child using a security strap system which has two loops 22 (one at each end of the strap).

It is also possible to connect together several security systems of the type shown in FIG. 1, for example, when one adult is caring for more than one child. This may be done by inserting a portion of loop 15 of the strap held by the adult through ring 16 of each additional security system. In such event only one of the straps need be held by, or fastened to, the adult.

The strap material which is useful in the practice of this invention is flexible and tear-resistant. It should also have good tensile strength and should not be too elastic (i.e., the strap material should not stretch more than about 20% at the limit of its tensile strength). The strap material also should not be abrasive to the skin and should not have sharp edges or corners which could cut or scrape the skin. As an added precaution against sharp edges, the very ends of the strap may be overstitched as illustrated by 14A in FIGS. 2 and 3 and by 20A in FIGS. 4, 7, 8, 9, 10 and 11.

A preferred strap material comprises a woven nylon web which is flexible and has a smooth and soft feel. A preferred width for the strap is about 0.5 to 1.5 inches. The length is preferably in the range of about 2 to about 4 feet. When the strap comprises a woven nylon web one inch wide and 0.067 inch in thickness it has a tensile strength of about 6,800 pounds and it weighs about 7.8 pounds per 100 yards of length.

Other types of materials could also be used for the strap. For example, canvas or cotton web can be used. It is also possible to use a polypropylene web, although it does not have the soft feel which nylon web exhibits.

It is also preferable for the strap material to be launderable so that it may be cleaned periodically without loss of strength. The nylon web described above is also preferable for this reason (i.e., it is easily washed without any deleterious effect).

If desired, the portion of the security system of the invention which is attached to the child may be lined with a very soft material such as wool, foam, rubber, etc. The opposite end, of course, could also include a layer of such material, if desired.

In another variation it is possible for either or both ends of the security system to be composed of one type of material (e.g., nylon web) and the balance of the security system to be composed of another type of material (e.g., polypropylene web).

The rings which are used in the security system of this invention are preferably metal D-rings. However, it is possible to also use O-rings or square rings. The ring members 18 and 19 (e.g., as illustrated in FIGS. 1–4 and 7–11) are independently mounted or secured to the strap material. This is best illustrated in the side elevational views of FIGS. 10 and 11. FIG. 10 illustrates the preferred embodiment where ring 19 is captured by end 20 of strap 12. End 20 has been passed through ring 19 and then folded back against itself and preferably stitched, as represented by dotted line 20B. The exposed edge portion of end 20 is preferably overstitched, as represented by lines 20A. Alternatively, end 20 could be riveted to strap 12.

Ring 18 is preferably secured to the outer face of end 20 of strap 12, as illustrated in FIG. 10. This may be accomplished, for example, by stitching 18B. Preferably ring 18 is off-set slightly from ring 19 so that there is room for strap 12 to pass over the top of ring 18 and then through ring 19, as shown.

Another manner of attaching rings 18 and 19 is illustrated in FIG. 11. In this embodiment ring 19 is secured to strap 12 by stitching 19B. Ring 18 is captured by the folded end 20 but is not otherwise secured to strap 12. Other manners of attachment may also be used.

It is also possible to use rings of dissimilar types and sizes, if desired. However, if different size rings are used it is preferable for the smaller ring to be used in the position of ring 19 so that ring 18 cannot be pulled through ring 19.

Preferred ring members are welded closed (i.e., the ends of the metal rod from which they are made are preferably welded together). It is also preferred that the rings be nickel plated.

Preferably the ring members used in the security systems of this invention have an internal width (i.e., distance from one side to the opposite side within the ring) which is no greater than the width of the strap. This provides for greater holding power of the strap in the rings. Even more preferably the internal width of each ring member is slightly less (e.g., 1/16 inch) than the width of the strap passing through the ring. This results in even greater holding power when the strap is threaded through the rings.

Other manners of securing the strap to form loops 15 and 22 may also be used so long as the loop 22 (which is to be attached to the child) is capable of maintaining a fixed diameter in use, and cannot be opened or released by the child using one hand. This provides additional safety and security because the parent knows that the child cannot release himself from the system. A parent, using two hands, can readily place the loop around the child's wrist and tighten it to the desired diameter. The parent can also readily remove the loop from the child, when desired, using two hands.

When using D-rings for rings 18 and 19 in the manner shown in the drawings, and when the D-rings have an internal width about 1/16 inch less than the width of the strap, it has been found that no slippage of strap 12 through the rings occurs even at a pulling force of 175 pounds. Thus, the loop 22 is maintained at a fixed diameter and will not tighten around the child's wrist in use.

The end of the strap which is to be connected to the parent may include various types of fastening means. For example, it may include a simple ring, as illustrated in the drawings, which can be used to form a self-tightening loop when the strap is pulled through it. This type of loop may be placed around the parent's wrist or belt, etc.

Other types of fastening means may be used on the adult or parent end, if desired. For example, a conventional buckle may be used, or a type of hook-and-loop fastener, etc. may be used, if desired. It is also possible to fasten the end around the waist of the parent.

In other embodiments the security system of the invention may be used in rest homes, institutions, hospitals, etc. where it is necessary to restrain persons because of mental or physical impairment. For such uses the loop 22 is placed around the wrist of the person being restrained, and the opposite end of the strap (i.e., the free end) may be secured to a bed or whatever may be required for such person. The fastening means for the free end may be a loop, a ring, a hook-and-loop fastener, conventional buckle, etc.

Other variants are possible without departing from the scope of the present invention.

What is claimed is:

1. A security system adapted to secure two children to an adult, said security system comprising (a) a first length of flexible strap having first and second ends, and (b) a second length of flexible strap having first and second ends; wherein said first end of said second strap is secured to said first strap; wherein said first end of said first strap is adapted to form a first loop which is capable of being detachably fastened to said adult; wherein said second ends of said first and second straps each comprise a loop which is adapted to be detachably secured around the wrist of one of said children; and wherein each said second loop of said first and second straps is adapted to maintain a fixed diameter after being placed around the wrist of one of said children.

2. A security system in accordance with claim 1, wherein said first end of said first strap includes a ring member.

3. A security system in accordance with claim 1, wherein said first strap has a length in the range of about 2 to 4 feet, and wherein said second strap has a length in the range of about 2 to 4 feet.

4. A security system in accordance with claim 1, wherein said first and second straps comprise nylon web.

5. A security system in accordance with claim 1, wherein said first end of said second strap is attached to said first strap by means of a buckle.

6. A security system in accordance with claim 1, wherein said second ends of said first and second straps each include two ring members secured thereto, and wherein said first and second straps, repectively, are adapted to extend through said two ring members of each said strap.

7. A security system in accordance with claim 6, wherein said ring members comprise D-rings.

* * * * *